(12) United States Patent
Miyazawa et al.

(10) Patent No.: US 10,520,376 B2
(45) Date of Patent: Dec. 31, 2019

(54) LOAD CELL HAVING A COMPUTATION UNIT WHICH COMPUTES DISPLACEMENT AMOUNT OF THE DIFFRACTION GRATING

(71) Applicant: TAIYO YUDEN CO., LTD., Tokyo (JP)

(72) Inventors: Fuyuki Miyazawa, Tokyo (JP); Katsuhiro Oyama, Tokyo (JP); Isao Matsuda, Tokyo (JP); Yasuhito Hagiwara, Tokyo (JP); Takaki Hamamoto, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/787,429

(22) Filed: Oct. 18, 2017

(65) Prior Publication Data

US 2018/0106690 A1    Apr. 19, 2018

(30) Foreign Application Priority Data

Oct. 19, 2016 (JP) ................................ 2016-204940

(51) Int. Cl.
*G01L 1/25* (2006.01)
*G01L 1/22* (2006.01)
(Continued)

(52) U.S. Cl.
CPC .................. *G01L 1/22* (2013.01); *G01L 1/04* (2013.01); *G01L 1/06* (2013.01); *G01L 1/2206* (2013.01); *G01L 1/24* (2013.01); *G01L 1/25* (2013.01)

(58) Field of Classification Search
CPC ...... G01D 5/266; G01D 5/38; G01D 5/34715; G02B 27/4272; G02B 27/4255;
(Continued)

(56) References Cited

U.S. PATENT DOCUMENTS 7,355,720 B1 * 4/2008 Carr ....................... G01H 9/004
356/498
7,485,847 B2 * 2/2009 Degertekin ............ G01D 5/285
250/205
(Continued)

FOREIGN PATENT DOCUMENTS

JP    2007-212255 A    8/2007

*Primary Examiner* — Brandi N Hopkins
(74) *Attorney, Agent, or Firm* — Chen Yoshimura LLP

(57) ABSTRACT

In one aspect, a load cell includes an elastic body, first optical unit, second optical unit, detector, and computation unit. The first optical unit has a light source, a first diffraction grating on which light from the light source is incident, and a light-receiving unit. The first optical unit is fixed to a first end portion of the elastic body and arranged within a hollow portion of the elastic body. The second optical unit has a second diffraction grating on which diffracted light from the first diffraction grating is incident to generate interference light. The second optical unit is fixed to a second end portion of the elastic body and arranged within the hollow portion. The detector detects the interference light. The computation unit computes a relative displacement amount of the second diffraction grating relative to the first diffraction grating on the basis of a signal obtained by the detector.

5 Claims, 13 Drawing Sheets

(51) Int. Cl.
*G01L 1/04* (2006.01)
*G01L 1/06* (2006.01)
*G01L 1/24* (2006.01)

(58) Field of Classification Search
CPC .... B62M 6/50; G01L 5/16; G01L 1/04; G01L 3/08; G01L 3/1421; G01L 5/226; G01L 5/166
See application file for complete search history.

(56) References Cited

U.S. PATENT DOCUMENTS

| 2005/0185196 A1* | 8/2005 | Kitamura | G01B 11/16 |
| | | | 356/614 |
| 2005/0257627 A1* | 11/2005 | Kitamura | G01L 5/166 |
| | | | 73/862.381 |
| 2008/0304079 A1* | 12/2008 | Schluchter | G01D 5/34715 |
| | | | 356/499 |
| 2016/0138906 A1* | 5/2016 | Lacolle | H04R 23/008 |
| | | | 356/614 |

\* cited by examiner

LOAD CELL HAVING A COMPUTATION UNIT WHICH COMPUTES DISPLACEMENT AMOUNT OF THE DIFFRACTION GRATING

BACKGROUND OF THE INVENTION

Technical Field

The present technique relates to a load cell, and particularly relates to improving the measurement accuracy of a load cell.

Background Art

Patent Document 1, for example, discloses a technique pertaining to a strain gauge load cell in which two pairs of strain gauges are affixed to a block having elasticity, called an elastic body. In the technical fields of electronic scales and load cells, conventional methods are known in which strain gauges are, as in Patent Document 1, affixed to areas of the elastic body where stress concentrates, strain is detected when a load acts thereon, and a weight corresponding to the detected strain is calculated.

RELATED ART DOCUMENTS

Patent Documents

Patent Document 1: Japanese Patent Application Laid-Open Publication No. 2007-212255

SUMMARY OF THE INVENTION

Recent years have seen demand for improvement in the measurement accuracy of load cells. However, there is a limit on how much the SN ratio (S/N) can be improved in a strain gauge load cell, which has made it difficult to improve the measurement accuracy any further.

In light of the above-described circumstances, an object of the present technique is to provide a load cell capable of further improving measurement accuracy.

Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a load cell, including: an elastic body having a first end portion, a second end portion opposite to the first end portion in one axial direction, and a bridge portion bridging the first and second end portions and defining a hollow space between the first and second end portions; a first optical unit having a light source and a first diffraction grating on which light from the light source is incident, the first optical unit being fixed to the first end portion and arranged in the hollow space; a second optical unit having a second diffraction grating on which diffracted light emitted from the first diffraction grating is incident to generate interference light, the second optical unit being fixed to the second end portion and arranged in the hollow space; a detector that detects the interference light; and a computation unit that computes a displacement amount of the second diffraction grating relative to the first diffraction grating on the basis of a signal obtained by the detector so as to detect a displacement amount of the second end potion relative to the first end portion.

This load cell is configured to compute the relative displacement amount of the second end portion relative to the first end portion on the basis of the interference light of the diffracted light generated by the first diffraction grating and the second diffraction grating, and can therefore measure a load with a high resolution, a high S/N, and a high level of accuracy.

The first diffraction grating and the second diffraction grating may be arranged on a center axis passing through the hollow space and parallel to the one axial direction. According to this configuration, bias placement error for a measurement subject can be suppressed, and a load can be measured accurately, in situations where the relative position of the measurement subject relative to the elastic body is not uniform.

In this case, the load cell may further include a placement table fixed to the second end portion for receiving an object having a weight to be measured, and the second diffraction grating may be arranged in a position directly below a centroid of the placement table.

On the other hand, the first diffraction grating and the second diffraction grating may be arranged respectively in positions offset in a widthwise direction of the elastic body from a center axis passing through the hollow space and parallel to the one axial direction. According to this configuration, fluctuations in the measurement value caused by creeping in the elastic body can be suppressed, and the load can be measured accurately, in situations such as when the relative position of the measurement subject relative to the elastic body is uniform.

The bridge portion may include a pair of bridge members opposing each other with the hollow space defined therebetween, the bridge members respectively connecting the first end portion and the second end portion to each other; and at least one of the pair of bridge members may have a thickness that varies in the widthwise direction of the elastic body orthogonal to the one axial direction.

As described above, according to the present technique, measurement accuracy can be further improved.

It is to be understood that both the foregoing general description and the following detailed description are exemplary and explanatory, and are intended to provide further explanation of the invention as claimed.

DETAILED DESCRIPTION OF EMBODIMENTS

Embodiments of the present technique will be described hereinafter with reference to the drawings.

<Embodiment 1>

Figure 1:
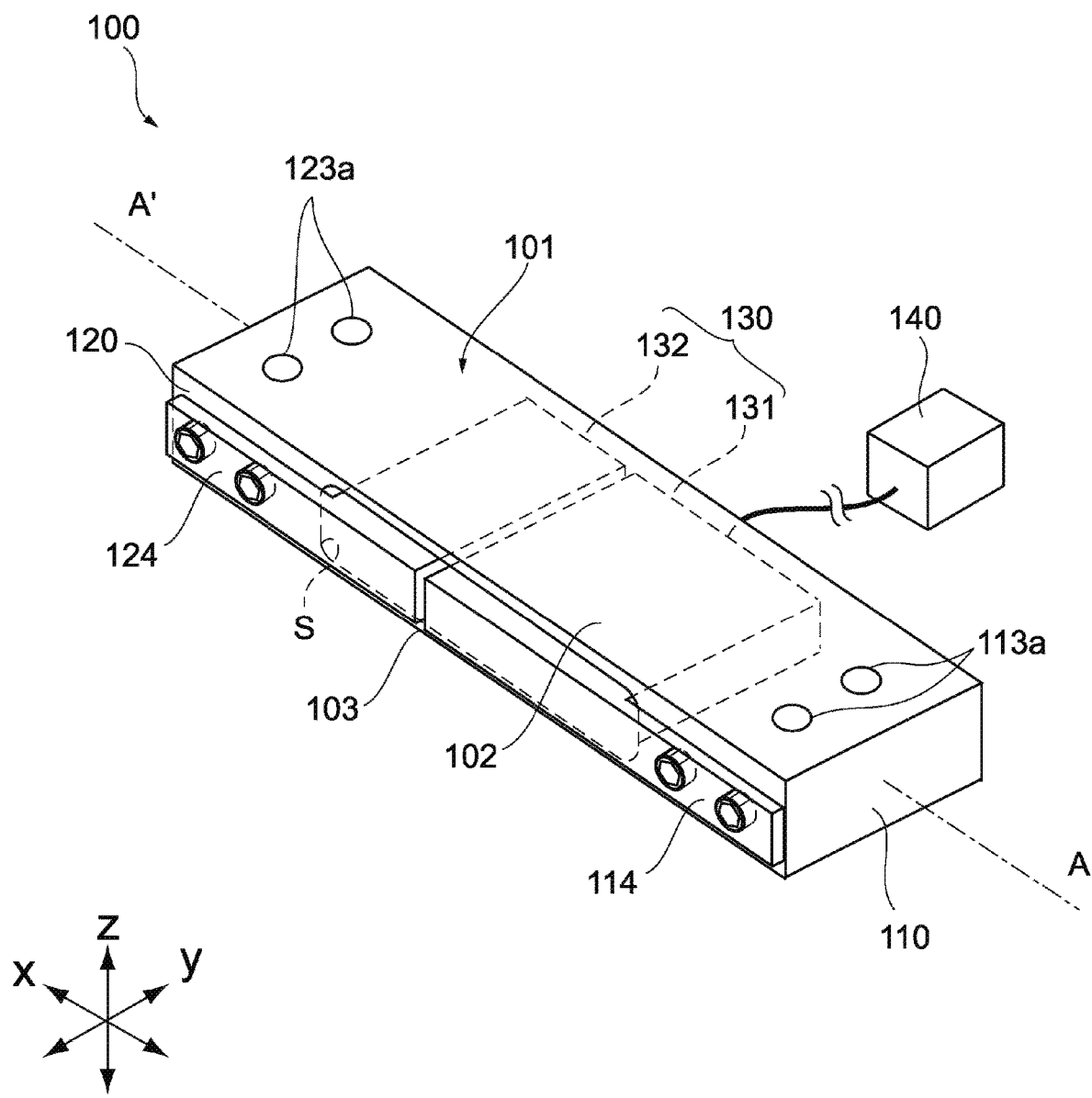
FIG. 1 is an external perspective view of a load cell according to an embodiment of the present invention.
Figure 2:
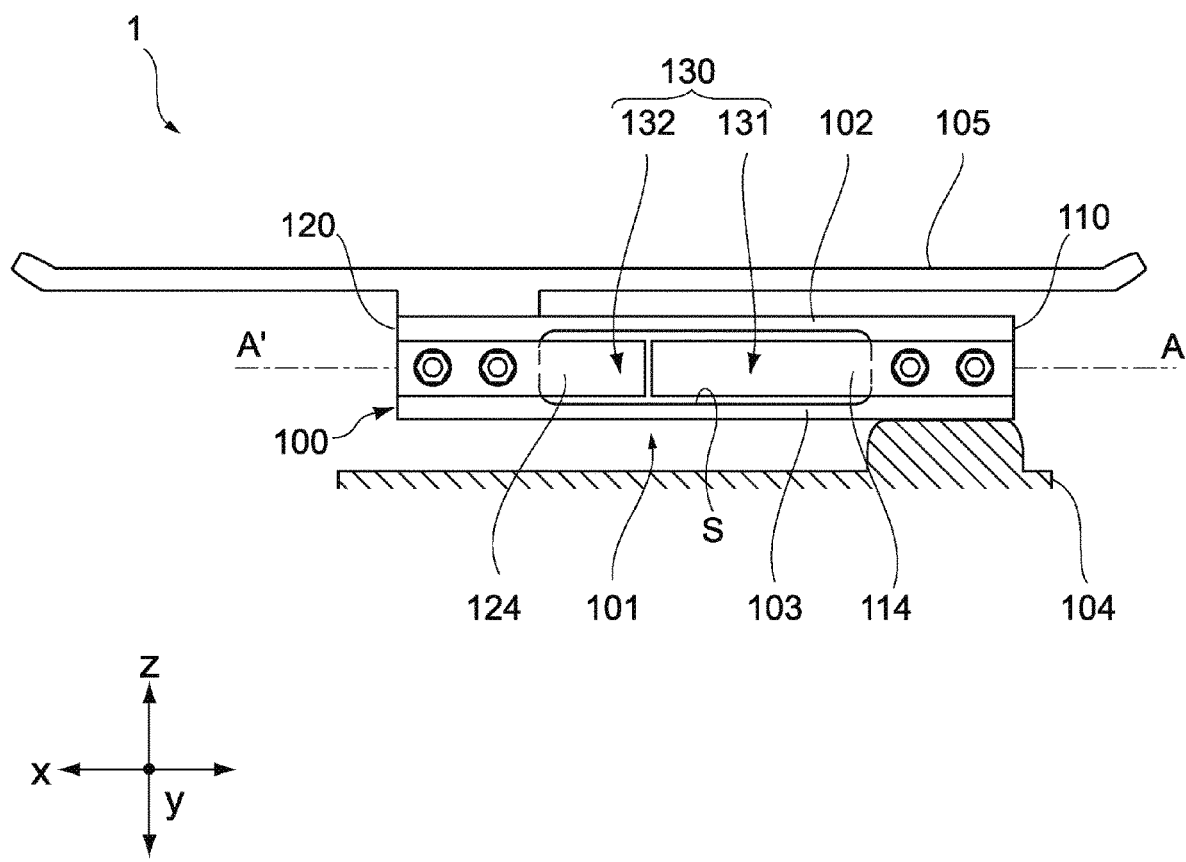
FIG. 2 is a schematic side view of a load measurement system including the aforementioned load cell.

FIG. 1 is a schematic perspective view illustrating the external appearance of a load cell 100 according to Embodiment 1 of the present invention, and FIG. 2 is a schematic side view of a load measurement system 1 including the load cell 100.

In the drawings, the x axis, y axis, and z axis represent three mutually-orthogonal axial directions, with the x and y axes corresponding to horizontal directions and the z axis corresponding to a height direction.

As illustrated in FIG. 1, the load cell 100 includes an elastic body 101, an optical displacement sensor 130, and a computation unit 140. As illustrated in FIG. 2, the load measurement system 1 includes the load cell 100, a fixing base 104, and a placement table 105.

<Elastic Body>

The elastic body 101 is formed into a rectangular cuboid having a lengthwise direction in the x-axis direction, a widthwise direction in the y-axis direction, and a height (thickness) direction in the z-axis direction, or into a shape similar thereto. The elastic body 101 is formed of an elastic material that deforms in proportion to external stress, and is typically formed as a block of metal such as an aluminum alloy. In the drawings, an AA' axis indicates a center axis that passes through the center of the elastic body 101 and is parallel to the x-axis direction.

The elastic body 101 includes a first end portion 110, a second end portion 120, a hollow portion S, and two bridge portions 102 and 103.

The first end portion 110 and the second end portion 120 face each other in the x-axis direction. The first end portion 110 corresponds to an end portion (a fixed end) on a fixed side of the elastic body 101, and as illustrated in FIG. 2, is fixed to the fixing base 104, which is installed in a static system such as a workbench or a frame. On the other hand, the second end portion 120 corresponds to an end portion (a free end) on a mobile side of the elastic body 101 and as illustrated in FIG. 2, is fixed to a bottom portion of the placement table 105 on which a measurement subject is placed.

The hollow portion S is provided between the first end portion 110 and the second end portion 120, and is formed into a through-hole, having a wider dimension in the x-axis direction, that penetrates the elastic body 101 in the widthwise direction thereof (the y-axis direction). The optical displacement sensor 130 is at least partially contained in the hollow portion S, as will be described later.

The bridge portions 102 and 103 are constituted by plate portions facing each other in the z-axis direction, with the hollow portion S located therebetween. The bridge portions 102 and 103 connect the first end portion 110 and the second end portion 120 to each other, with the one bridge portion 102 constituting an upper surface of the elastic body 101 and the other bridge portion 103 constituting a lower surface of the elastic body 101. The bridge portions 102 and 103 constitute a primary deforming region of the elastic body 101 that causes the second end portion 120 to displace in the z-axis direction relative to the first end portion 110 when a load is applied.

The first end portion 110 and the second end portion 120 are formed so as not to deform when a load is applied, or to deform only by an amount small enough to be ignored as compared to the deformation of the bridge portions 102 and 103.

The fixing base 104 is fixed to the lower surface of the first end portion 110. A plurality of screw holes 113$a$, into which fasteners (not shown) for binding the first end portion 110 and the fixing base 104 are threaded, are provided in the first end portion 110. Meanwhile, the placement table 105 is fixed to the upper surface of the second end portion 120. A plurality of screw holes 123$a$, into which fasteners such as screws (not shown) for binding the second end portion 120 and the placement table 105 are threaded, are provided in the second end portion 120.

<Optical Displacement Sensor>

The optical displacement sensor 130 includes a first optical unit 131 fixed to the first end portion 110 of the elastic body 101, and a second optical unit 132 fixed to the second end portion 120 of the elastic body 101.

The first optical unit 131 and the second optical unit 132 have a first optical block B1 and a second optical block B2, respectively, that are arranged in the hollow portion S of the elastic body 101, facing each other with respect to the x-axis direction.

The first optical block B1 is integrally connected to a first support arm 114 screwed onto one side surface of the first end portion 110, and is arranged within the hollow portion S so as not to make contact with an inner wall surface thereof.

The second optical block B2 is integrally connected to a second support arm 124 screwed onto one side surface of the second end portion 120, and is arranged within the hollow portion S so as to make contact with neither an inner wall surface thereof nor the first optical block B1.

Figure 3:
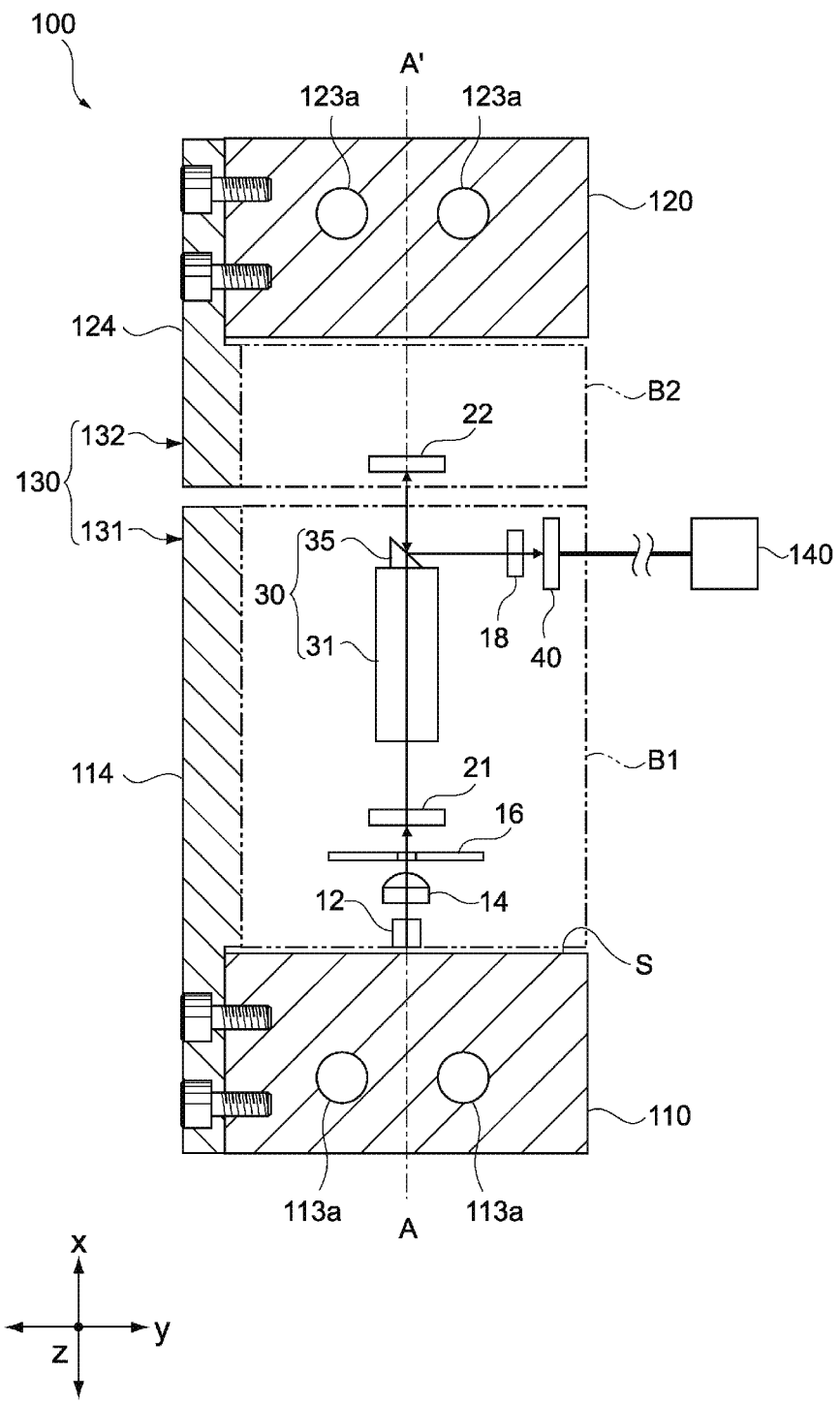
FIG. 3 is a schematic planar cross-sectional view of the aforementioned load cell.
Figure 4:
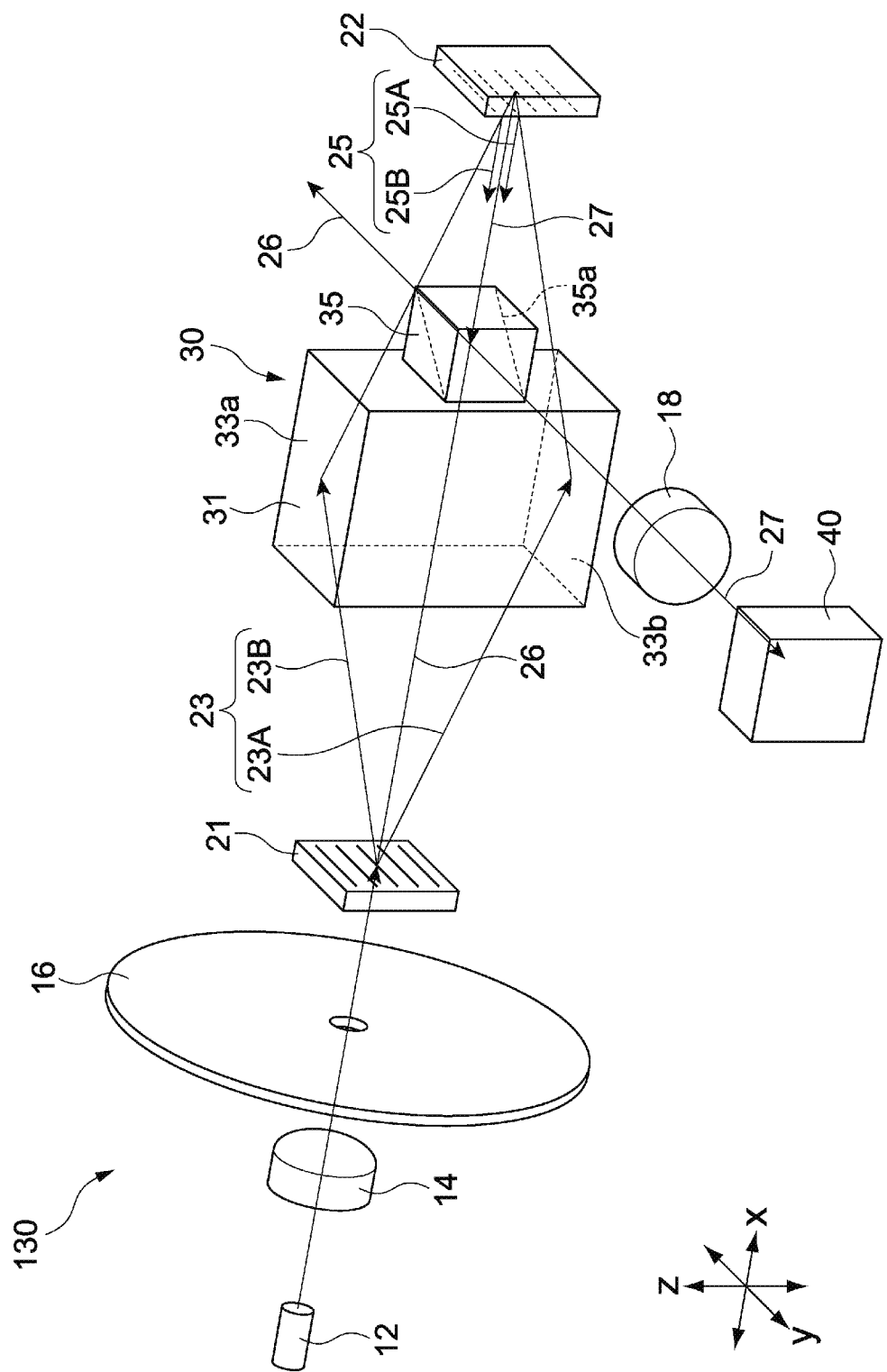
FIG. 4 is a schematic perspective view illustrating an optical system of the aforementioned load cell.
Figure 5:
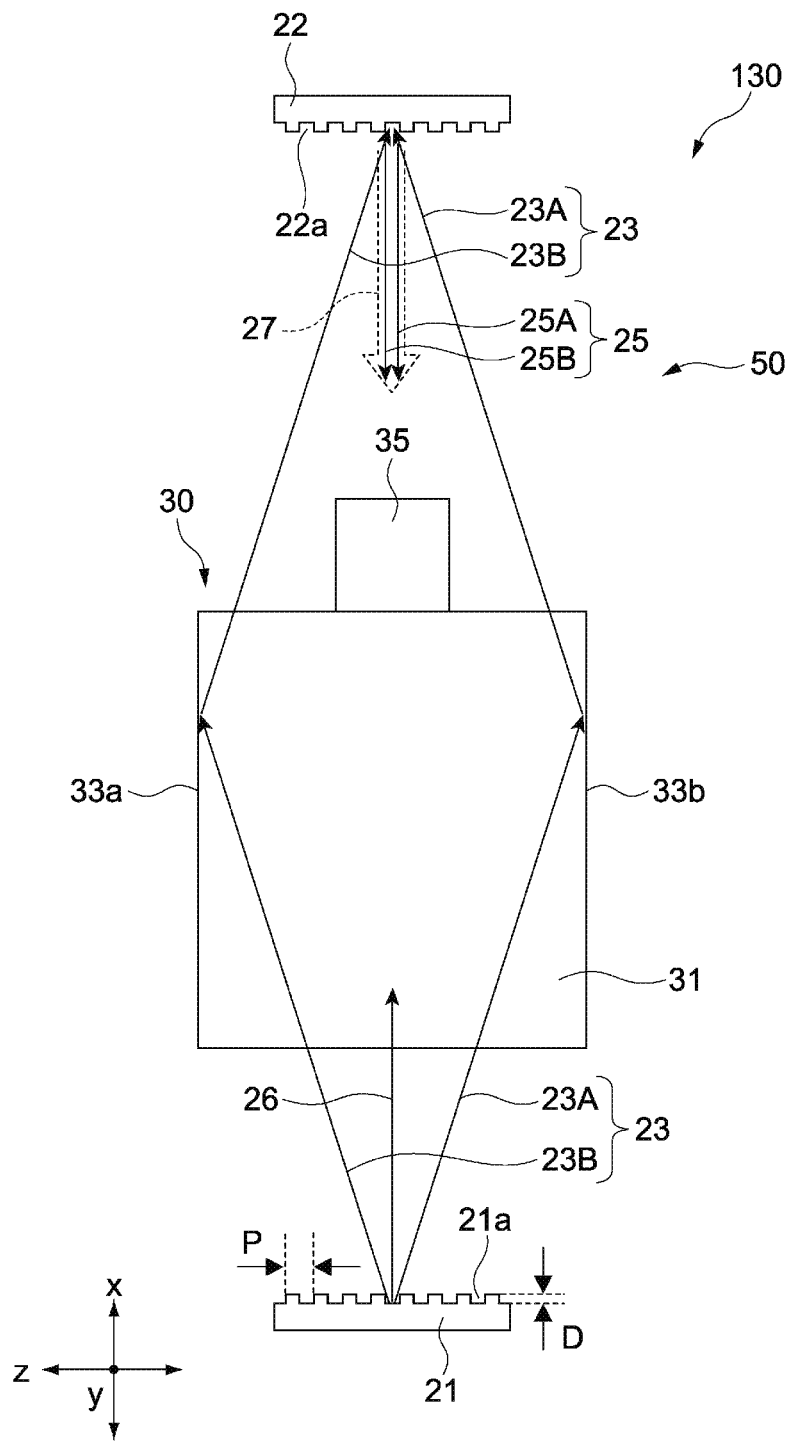
FIG. 5 is a schematic side view illustrating the optical system of the aforementioned load cell.

FIG. 3 is a schematic cross-sectional view, parallel to an xy plane, taken along a center axis AA' and illustrating the internal structure of the load cell 100 (the optical displacement sensor 130). FIG. 4 is a schematic perspective view illustrating the optical system of the optical displacement sensor 130, and FIG. 5 is a schematic side view, parallel to an xz plane, illustrating the optical system of the optical displacement sensor 130.

As illustrated in FIG. 3, the first optical block B1 includes a light source 12, collimate lenses 14 and 18, an aperture member 16, a first diffraction grating 21, an optical member 30, and a photodetector (PD) (or a photodiode) 40. The second optical block B2 includes a second diffraction grating 22. The light source 12, the collimate lenses 14 and 18, the aperture member 16, and the photodetector 40 are not shown in FIG. 5.

In the load cell 100 according to the present embodiment, the first diffraction grating 21 is supported by the first optical block B1, and the second diffraction grating 22 is supported by the second optical block B2 so as to be capable of displacing in the z-axis direction relative to the first optical block B1. In other words, the load cell 100 is configured to detect a load exerted on the elastic body 101, or strain in the elastic body 101, or the weight of a measurement subject placed on the placement table 105, on the basis of a relative displacement amount between the two diffraction gratings 21 and 22 in the z-axis direction.

The light source 12 is a laser diode (LD) or a light-emitting diode (LED), and is driven by a driver (not shown). The light source 12 is a light-emitting element that emits a laser beam having a central wavelength set to 400 nm to 900 nm, for example, but of course is not limited to such a configuration.

The collimate lens 14 converts the beam emitted from the light source 12 into parallel light. An optical system that generates parallel light is constituted by at least the light source 12 and the collimate lens 14. The aperture member 16 has a function for constricting the beam diameter of the light emitted from the collimate lens 14 to a prescribed beam diameter. In principle, however, the collimate lens 14 and the aperture member 16 may be omitted.

The first diffraction grating 21 and the second diffraction grating 22 have a plurality of grating lines (grating grooves) 21a and 22a, respectively, that are formed at the same pitch P (see FIG. 5) and at the same orientation. The first diffraction grating 21 and the second diffraction grating 22 are configured to be able to be displaced relative to each other in the arrangement direction (the z-axis direction, in the drawings) of the grating lines 21a and 22a. The optical displacement sensor 130 measures this relative displacement.

The first diffraction grating 21 is a transmissive diffraction grating. As illustrated in FIG. 5, the first diffraction grating 21 receives light emitted from the light source 12 through the aperture member 16, and emits diffracted light 23 (23A and 23B). This diffracted light includes a plurality of orders, namely ±first-order, ±second-order, and so on up to ±nth-order (where n is a natural number) diffracted light. This diffracted light also includes zero-order diffracted light (called "zero-order light" hereinafter) 26 that traverses the first diffraction grating 21 perpendicular to the grating surface thereof.

To simplify the descriptions, assuming an axis line that is along the x axis in FIG. 5 and passes through the centers of the first diffraction grating 21 and the second diffraction grating 22, the diffracted light 23A generated on the right side of the line is positive (+) diffracted light and the diffracted light 23B generated on the left side of the line is negative (−) diffracted light.

The optical member 30 is configured to reflect ±mth-order diffracted light 23 (m=1, 2, 3, . . . , or n), which is diffracted light of a specific order among the multiple-order diffracted light emitted from the first diffraction grating 21, and guide the ±mth-order diffracted light 23 to the second diffraction grating 22. The ±mth-order diffracted light 23 is typically ±first-order diffracted light, but may be ±second-order diffracted light, or diffracted light of a higher order, for example.

The optical member 30 includes an optical guide member 31 having a rectangular cuboid shape, for example, and a prism mirror 35 that is connected to the optical guide member. In other words, the optical guide member 31 and the prism mirror 35 are provided integrally.

The prism mirror 35 is attached to one side surface of the optical guide member 31 in the x-axis direction, for example. As illustrated in FIG. 14, the prism mirror 35 has a mirror portion 35a disposed within a transparent member at, for example, a 45° degree angle relative to the x axis. As will be described later, the prism mirror 35 has a function for reflecting light, which has been reflected by the second diffraction grating 22, at a right angle toward the photodetector 40. The prism mirror 35 also functions as a reflective member that reflects the zero-order light 26 emitted from the first diffraction grating 21 in the direction opposite from the photodetector 40, so that the light is not conducted toward the second diffraction grating 22.

The two side surfaces of the optical guide member 31 in the z-axis direction are provided as a pair of reflective surfaces 33a and 33b that face each other and are parallel to each other. The +mth-order diffracted light 23A and −mth-order diffracted light 23B generated by the first diffraction grating 21 are incident on the pair of reflective surfaces 33a and 33b, respectively, and the pair of reflective surfaces 33a and 33b conducts the instances of diffracted light to the second diffraction grating 22.

The pair of reflective surfaces 33a and 33b may completely or only partially reflect the ±mth-order diffracted light 23 from the first diffraction grating 21. Whether or not the light is completely reflected depends on the wavelength of the light, the structure of the diffraction grating, the arrangement and design of each optical component, and so on. Alternatively, reflective films constituted by metal films, for example, may be formed on the pair of reflective surfaces 33a and 33b.

The optical guide member 31 may lack a transparent main body, and the pair of reflective surfaces may instead be two physically independent mirrors. However, using both side surfaces of the optical guide member 31 as the pair of reflective surfaces 33a and 33b, or in other words, providing the optical guide member 31 and the pair of reflective surfaces 33a and 33b integrally, makes it easy to manufacture the optical guide member 31 including the pair of reflective surfaces 33a and 33b. This also makes it easy to position the pair of reflective surfaces 33a and 33b relative to each other.

Likewise, although the optical guide member 31 and the prism mirror 35 may be separate entities, providing these elements integrally makes it easy to manufacture the optical member 30, and also makes it easy to position the optical guide member 31 and the prism mirror 35 relative to each other.

Silica glass is an example of the material of which the optical guide member 31 is formed. However, another type of glass, a transparent material aside from glass, or the like may be used instead. A transparent material made of a resin material can be selected, for example. When a central wavelength of the light emitted from the light source 12 is $\lambda$ (where $\lambda$=633 nm, for example), it is preferable that the plane precision of the reflective surfaces 33a and 33b be no greater than $\lambda/4$. If the plane precision of the reflective surfaces 33a and 33b is low, interference light 27 (mentioned later) of a desired state cannot be obtained, which can cause a drop in measurement accuracy.

The parallelism (angle) of the reflective surfaces 33a and 33b is no greater than one arcminute, and preferably is no greater than 30 arcseconds. The parallelism of the reflective surfaces 33a and 33b is also an important factor in obtaining the interference light 27 of a desired state.

No special limitation is placed on a length a of the reflective surfaces 33a and 33b of the optical guide member 31 in the direction in which the first diffraction grating 21 and the second diffraction grating 22 are arranged (the x-axis direction), and a length b of the reflective surfaces 33a and 33b in the direction orthogonal to the length a (the y-axis direction). For example, a=5 mm to 10 mm and b=2 mm to 5 mm, with a dimensional tolerance of ±0.1 mm. In this case, a grid line pitch of the first diffraction grating 21 and the second diffraction grating 22 is set to 1 µm to 5 µm; preferably, the pitch is 1.5 µm to 4 µm, and more preferably, is 2 µm. The length of the reflective surfaces 33a and 33b in the z-axis direction is set depending on the wavelength of the light, the structure of the diffraction grating, the arrangement and design of each optical component, and so on.

The second diffraction grating 22 is a reflective diffraction grating. The second diffraction grating 22 has a function of generating and emitting the interference light 27 upon the ±mth-order diffracted light 23 emitted from the optical member 30 being incident thereon. Specifically, as illustrated in FIG. 5, the +mth-order diffracted light 23A is reflected by the grating surface of the second diffraction grating 22 to generate ±pth-order diffracted light (where p is a natural number including m). The −mth-order diffracted light 23B is reflected by the grating surface of the second diffraction grating 22 to generate ±pth-order diffracted light.

Zero-order light from the +mth-order diffracted light 23A generated by the second diffraction grating 22 returns along the optical path in which the −mth-order diffracted light 23B traveled. Zero-order light from the −mth-order diffracted light 23B generated by the second diffraction grating 22 returns along the optical path in which the +mth-order diffracted light 23A traveled.

The reflective second diffraction grating 22 may have a configuration in which a metal film is formed on a surface (grating surface) of a grating pattern region of a diffraction grating whose primary material is a transparent material, or may have a configuration with the primary material being metal.

FIG. 5 illustrates only −m'th-order diffracted light 25 (25A and 25B) of the ±pth-order diffracted light, which is the diffracted light emitted from the second diffraction grating 22. This "m'" indicates the same order as "m", which is the order of the diffracted light reflected by the pair of reflective surfaces 33a and 33b. Although the apostrophe is formally added to the order of the diffracted light emitted from the second diffraction grating 22 with respect to the order of the diffracted light emitted from the first diffraction grating 21 in order to simplify the descriptions, the respective orders are the same.

When the ±mth-order diffracted light 23 is ±first-order diffracted light as described above, the ±m'th-order diffracted light 25 is typically also ±first-order diffracted light. The interference light 27 is generated by the interference of the +m'th-order diffracted light 25A and the −m'th-order diffracted light 25B. The interference light 27 is incident on the prism mirror 35 along the x-axis direction.

The prism mirror 35 has a first surface and a second surface provided on the opposite side from the first surface. The first surface reflects the zero-order light 26, which traverses the first diffraction grating 21 and the optical guide member 31 and travels along the x-axis direction, at a right angle in the z-axis direction, causing the zero-order light 26 to travel toward the side opposite from the side on which the photodetector 40 is disposed. The second surface reflects the interference light 27, which is obtained by the interference of the ±m'th-order diffracted light 25 (25A and 25B) generated by the second diffraction grating 22, at a right angle in the z-axis direction, causing the light to travel toward the photodetector 40.

The photodetector 40 detects the interference light 27 emitted from the second diffraction grating 22. When the first diffraction grating 21 and the second diffraction grating 22 move relative to each other in the z-axis direction, the photodetector 40 obtains a light amount (corresponding to an optical intensity) of a periodic nature that takes a light-dark set as a single period for each pitch of the grid lines 21a (22a). A waveform having such a periodic nature is typically a sine curve. The photodetector 40 converts the detected light amount into an electrical signal and outputs the signal to the computation unit 140.

The computation unit 140 is electrically connected to the photodetector 40. The computation unit 140 is typically disposed outside of the elastic body 101. The computation unit 140 includes an AD converter and a computation circuit, for example. The computation circuit is configured to output a displacement on the basis of a voltage signal. The AD converter and/or the computation circuit may be provided integrally with the photodetector 40.

In the optical displacement sensor 130 according to the present embodiment configured as described above, mth-order diffracted light, which is diffracted light of a specific order, is reflected by the opposing and parallel pair of reflective surfaces 33a and 33b provided in the optical guide member 31, and is conducted to the second diffraction grating 22. The zero-order light 26 is reflected by the prism mirror 35 toward the side opposite from the side where the photodetector 40 is located. In other words, substantially only the ±mth-order diffracted light 23 is incident on the second diffraction grating 22, whereas diffracted light of other orders including the zero-order light 26, which are not needed for measuring displacement, are blocked mechanically. Accordingly, noise caused by unnecessary light being incident on the photodetector 40 can be substantially eliminated, and the displacement measurement accuracy can be improved.

Particularly, according to the present embodiment, a function of reflecting the zero-order light 26 from the first diffraction grating 21 and a function of reflecting the interference light 27 from the second diffraction grating 22 can both be realized by the single prism mirror 35, which helps reduce the size of the optical units.

<Effects of Present Embodiment>

Figure 6A:
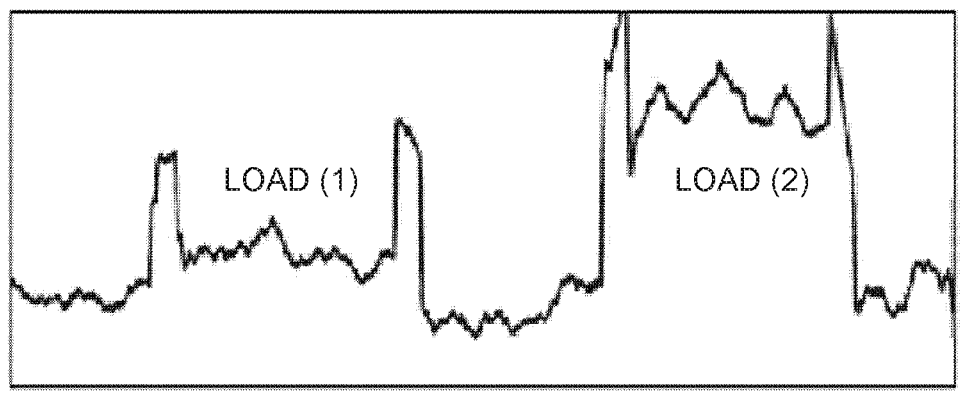
FIGS. 6A and 6B are diagrams each illustrating the detection of a load by the aforementioned load cell.
Figure 6B:
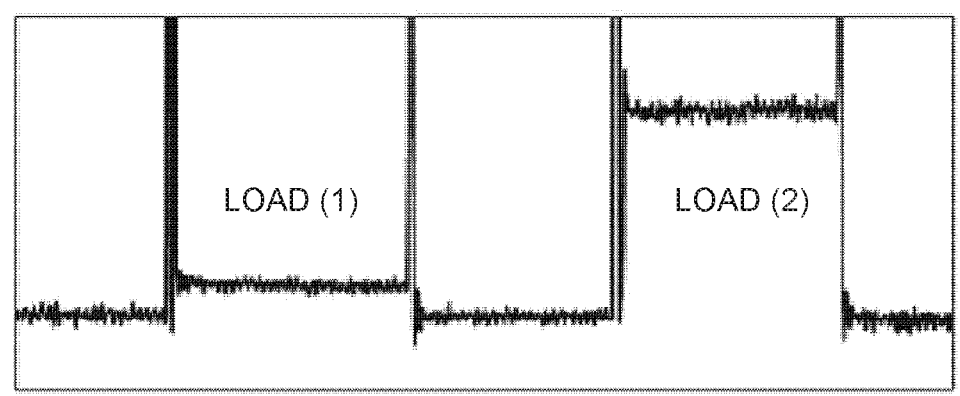

FIG. 6A is a diagram illustrating, as a comparison example, the state of measurement when a load is exerted on a load cell to which a conventional strain gauge is affixed. FIG. 6B is a diagram illustrating the state of measurement when a load is exerted on the load cell 100 according to the present embodiment. In FIGS. 6A and 6B, the horizontal axes represent time and the vertical axes represent load detection values; a change in the detection value when a load (1) is applied and when the load (1) is removed, and a change in the detection value when a load (2) is applied and when the load (2) is removed, are indicated. As illustrated in FIG. 6B, with the load cell 100 according to the present embodiment, there is less variation in the output when a load is applied than with the comparison example, and thus the load acting on the elastic body 101 can be detected with a high level of accuracy.

As described above, the load cell 100 according to the present embodiment is configured to compute the relative displacement amount of the second end portion relative to the first end portion on the basis of the interference light of the diffracted light generated by the first diffraction grating 21 and the second diffraction grating 22, and can therefore measure a load with a high resolution, a high S/N, and a high level of accuracy.

Furthermore, with the load cell 100 according to the present embodiment, the second diffraction grating 22 is arranged on the center axis AA' of the elastic body 101, as illustrated in FIG. 3. Accordingly, measurement error (hereinafter, referred to as "bias placement error") caused by differences in the placement position of the measurement subject relative to the placement table 105 can be suppressed.

"Bias placement error" refers to error in measurement values appearing due to differences in the position of the measurement subject placed on the placement table 105.

Figure 7A:
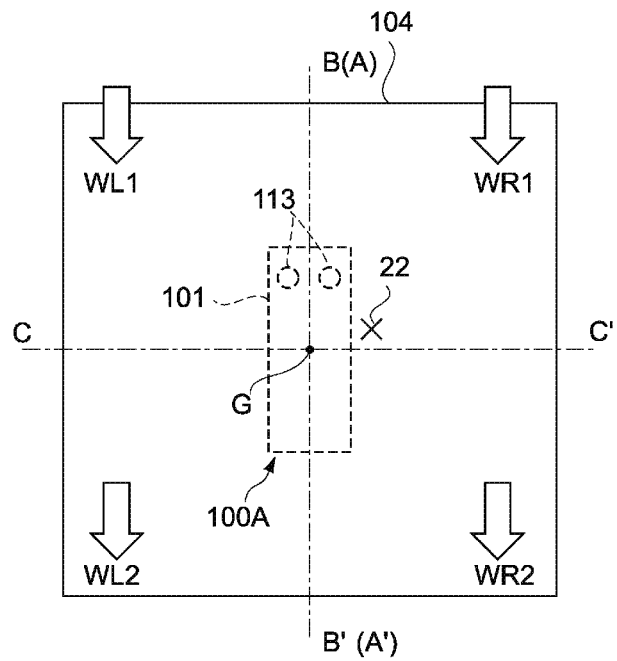
FIGS. 7A and 7B are schematic top views each illustrating effects of the aforementioned load cell.
Figure 7B:
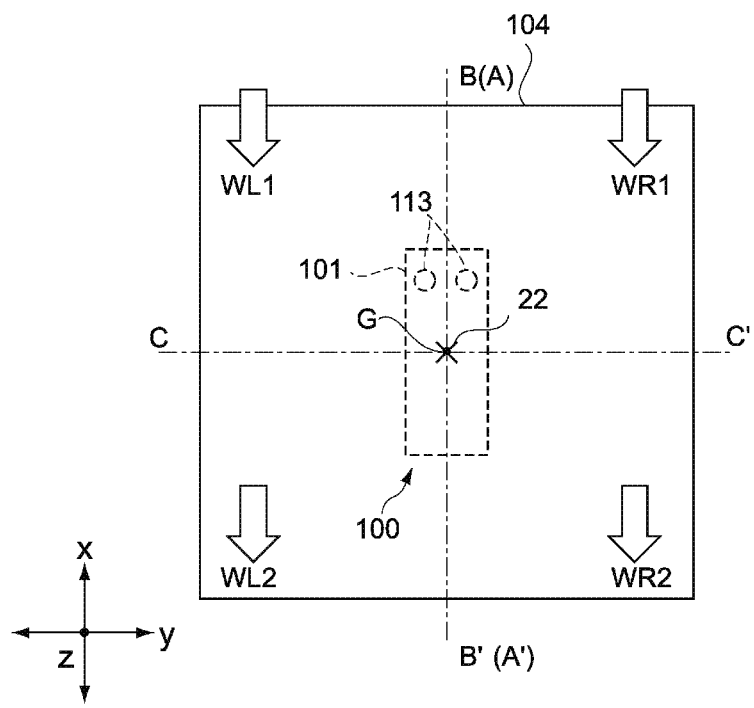
Figure 8A:
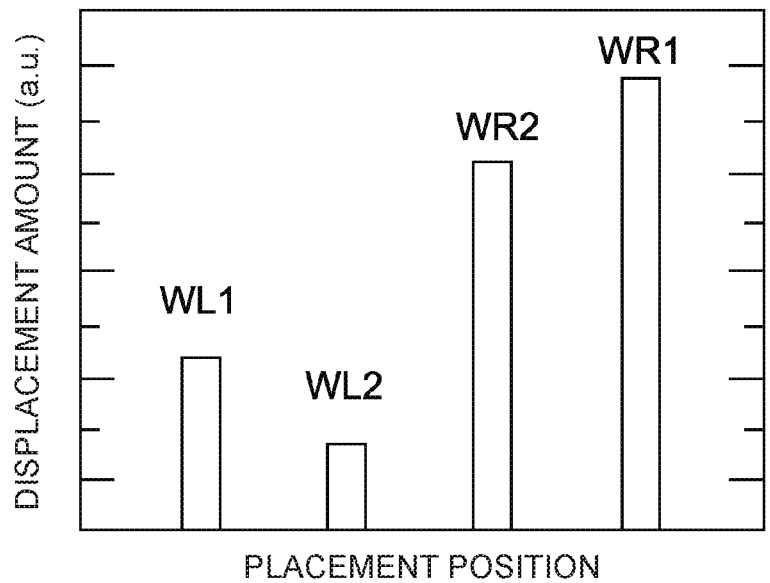
FIGS. 8A and 8B illustrate the results of an experiment showing the effects of the load cell illustrated in FIGS. 8A and 8B, respectively.
Figure 8B:
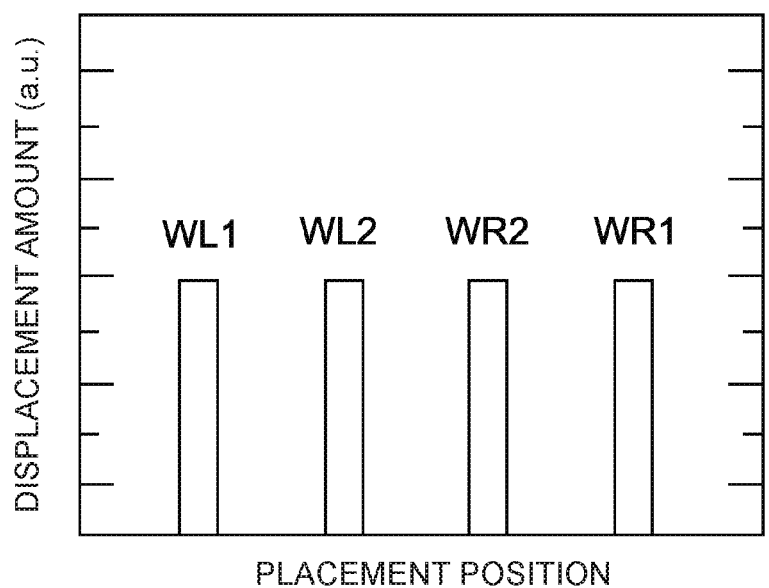

The inventors of the present invention prepared a load cell 100A including an optical system designed so that the second diffraction grating 22 was offset in the y-axis direction from the center axis AA' of the elastic body 101 when viewed in plan view, as illustrated in FIG. 7A, and the load cell 100 including an optical system designed so that the second diffraction grating 22 was located on the center axis AA' of the elastic body 101 when viewed in plan view, as illustrated in FIG. 7B. The placement table 105 having a square shape when viewed in plan view was then installed for the load cells 100A and 100, and the outputs (measurement results) of the load cells 100A and 100 were evaluated when measurement subjects having a prescribed weight were placed at four positions (four corner positions of the placement table 105, in this example) distanced from a centroid (center) position G of the placement table 105. FIGS. 8A and 8B indicate the results of the evaluation. The centroid position G of the placement table 105 is a point of intersection between symmetry axes BB' and CC', corresponding to perpendicular bisectors of respective sides of the placement table 105. The symmetry axis BB' matches the center axis AA' of the elastic body 101 when viewed in plan view.

FIG. 8A illustrates the output of the load cell 100A illustrated in FIG. 7A, whereas FIG. 8B illustrates the output ($\Delta z$) of the load cell 100 illustrated in FIG. 7B. In each figure, the horizontal axis represents the placement position of the measurement subject, and the vertical axis represents the output; "WL1", "WL2", "WR1", and "WR2" correspond to placement points of a measurement subject W on the placement tables 105 illustrated in FIGS. 7A and 7B. The placement points were locations at an equal distance from the centroid position G of the placement table 105. In this experiment example, the placement position of the measurement subject was changed in order from WL1→WL2→WR2→WR1, and the output (displacement amount) of the load cell was measured at each placement position.

As illustrated in FIGS. 8A and 8B, with the load cell 100A illustrated in FIG. 7A, the measurement results differed (that is, the bias placement error is high) depending on the position of the measurement subject on the placement table 105. On the other hand, with the load cell 100 illustrated in FIG. 7B, substantially constant measurement results (that is, low bias placement error) were obtained regardless of the position of the measurement subject. This is because of differences in the relative positions between the position of the second diffraction grating 22 and the centroid position G of the placement table 105 in the load cells 100A and 100. Particularly in this experiment example, with the load cell 100A illustrated in FIG. 7A, the position of the second diffraction grating 22 is arranged to be offset from the centroid position G of the placement table 105. However, with the load cell 100 illustrated in FIG. 7B, the position of the second diffraction grating 22 substantially matches the centroid position G of the placement table 105. In the latter load cell 100, since the second diffraction grating 22 is in a position of symmetry as seen from the placement positions (WL1, WL2, WR1, and WR2), it is thought that output error (bias placement error) resulting from the placement position of the measurement subject is effectively suppressed.

Figure 9A:
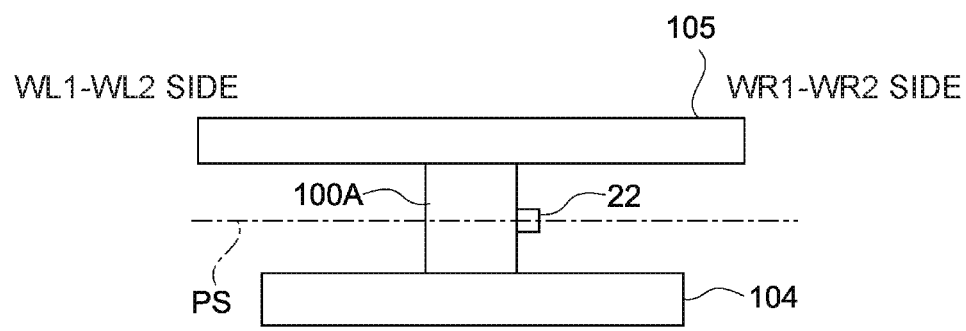
FIGS. 9A to 9C are schematic front views each illustrating an effect of the aforementioned load cell.
Figure 9B:
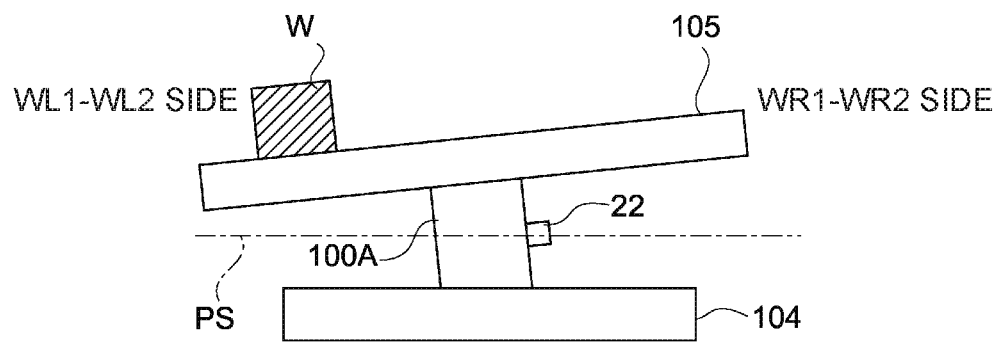
Figure 9C:
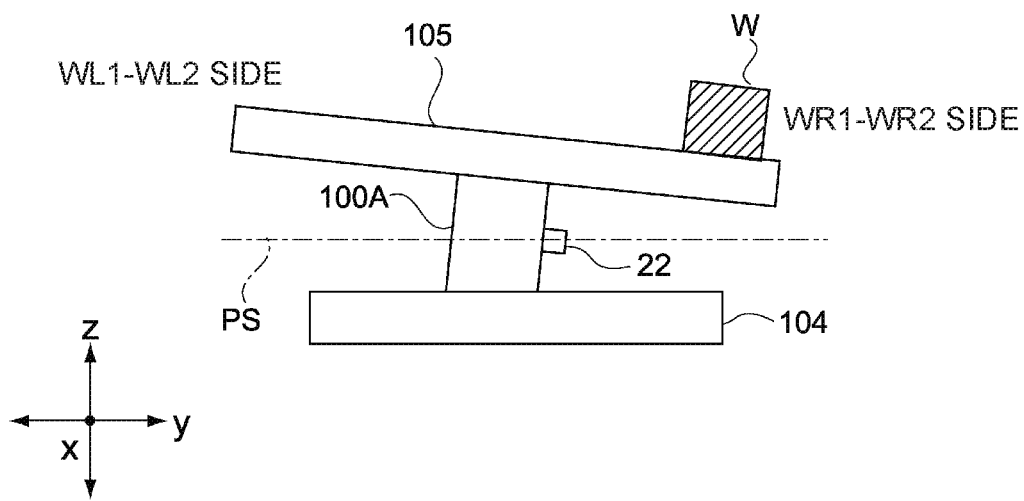

The following can be considered as a reason why the output of the load cell 100A, in which the position of the second diffraction grating 22 is offset from the center axis AA' of the elastic body 101, differs depending on the placement position of the measurement subject. FIGS. 9A, 9B and 9C are front views each schematically illustrating a relationship between the load cell 100A and the placement table 105, where FIG. 9A illustrates the relationship when no load is applied and FIGS. 9B and 9C illustrate the relationship when a load is applied. In the drawings, reference sign PS indicates a reference plane to which the optical axis position of the second diffraction grating 22 when no load is applied.

As illustrated in FIG. 9B, when the measurement subject W is placed toward the WL1-WL2 side, torsional stress in the counter-clockwise direction relative to the center axis acts on the elastic body 101, which deforms to the left in the drawing. Based on the principle of leverage, assuming that the elastic body 101 corresponds to the fulcrum, the placement point of the measurement subject W corresponds to the point of application, and the installation point of the second diffraction grating 22 corresponds to the point of action, the z-axis position (height) of the second diffraction grating 22 is displaced slightly higher than the position when no load is applied (PS). As a result, the displacement amount ($\Delta z$) of the second diffraction grating 22 relative to the first diffraction grating 21 decreases by the above-described amount of displacement (see the output of WL1 and WL2 in FIG. 8A).

However, as illustrated in FIG. 9C, when the measurement subject W is placed toward the WR1-WR2 side, torsional stress in the clockwise direction relative to the center axis acts on the elastic body 101, which deforms to the right in the drawing. On the contrary to the above-described situation, the z-axis position (height) of the second diffraction grating 22 is thus displaced slightly lower than the position (PS) when no load is applied. As a result, the displacement amount ($\Delta z$) of the second diffraction grating 22 relative to the first diffraction grating 21 increases by the above-described amount of displacement (see the output of WR1 and WR2 in FIG. 8A).

As described above, when the position of the second diffraction grating 22 is offset from the center axis AA' (the symmetry axis BB') of the elastic body 101, a large degree of bias placement error is more likely to be caused between the WL1-WL2 side and the WR1-WR2 side. As such, setting the position of the second diffraction grating 22 to be on the center axis AA' (the symmetry axis BB') makes it possible to reduce bias placement error in the y-axis direction of the placement table 105. On the other hand, setting the position of the second diffraction grating 22 to be on the symmetry axis CC' makes it possible to reduce bias placement error in the x-axis direction of the placement table 105. Furthermore, setting the position of the second diffraction grating 22 to be on the point of intersection (in other words, on the centroid position G) between the center axis AA' (the symmetry axis BB') and the symmetry axis CC' makes it possible to reduce bias placement error in both the x- and y-axis directions at the same time (see FIG. 8B).

Thus according to the present embodiment, the second diffraction grating 22 is arranged directly below the centroid position G of the placement table 105, and thus highly-accurate load measurements can be taken while suppressing variation in the measurement values caused by bias placement error. This is advantageous in measurement environments such as where the positions of the measurement subjects W relative to the elastic body 101 (the placement position of the measurement subject W relative to the placement table 105) may randomly change each time.

<Embodiment 2>

Figure 10:
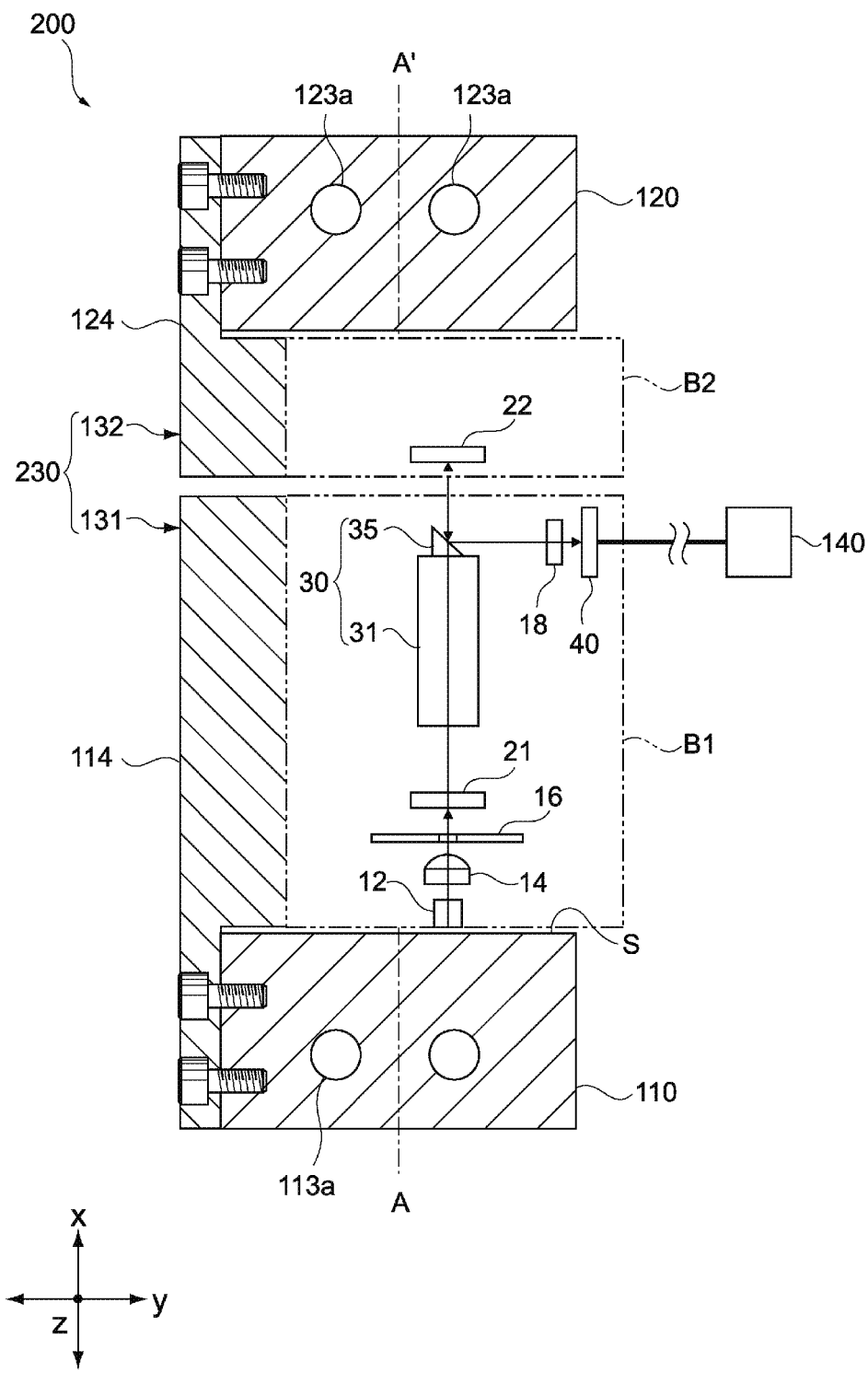
FIG. 10 is a schematic cross-sectional view of a load cell according to another embodiment of the present invention.

FIG. 10 is a schematic cross-sectional view illustrating the configuration of a load cell 200 according to Embodiment 2 of the present invention. The following will mainly describe elements that are different from Embodiment 1. Elements that are the same as those in Embodiment 1 will be given the same reference numerals and descriptions thereof will be omitted.

The load cell 200 differs from the above-described Embodiment 1 in terms of the configuration of an optical displacement sensor 230. That is, in the optical displacement sensor 230 according to the present embodiment, the second diffraction grating 22 is arranged in a position offset from the center axis AA' of the elastic body 101 in the widthwise direction of the elastic body 101 (the y-axis direction).

In order to set the second diffraction grating 22 in the above-described position, in the present embodiment, the optical axes of the first optical block B1 and the second optical block B2 are set to positions offset by a prescribed distance from the center axis AA' in the widthwise direction of the elastic body 101 (the y-axis direction). Accordingly, the second diffraction grating 22 can be arranged in an arbitrary position without changing the configurations of the first optical block B1 and the second optical block B2, and furthermore, it is not necessary to position the light source 12, the first diffraction grating 21, the photodetector 40, and so on independently with respect to the second diffraction grating 22.

The load cell 200 according to the present embodiment configured as described above corresponds to the load cell 100A described with reference to FIG. 7A. With the load cell 200 according to the present embodiment, error in the displacement amount arising over time due to creeping can be suppressed. Creeping will be described with reference to FIG. 11.

Figure 11:
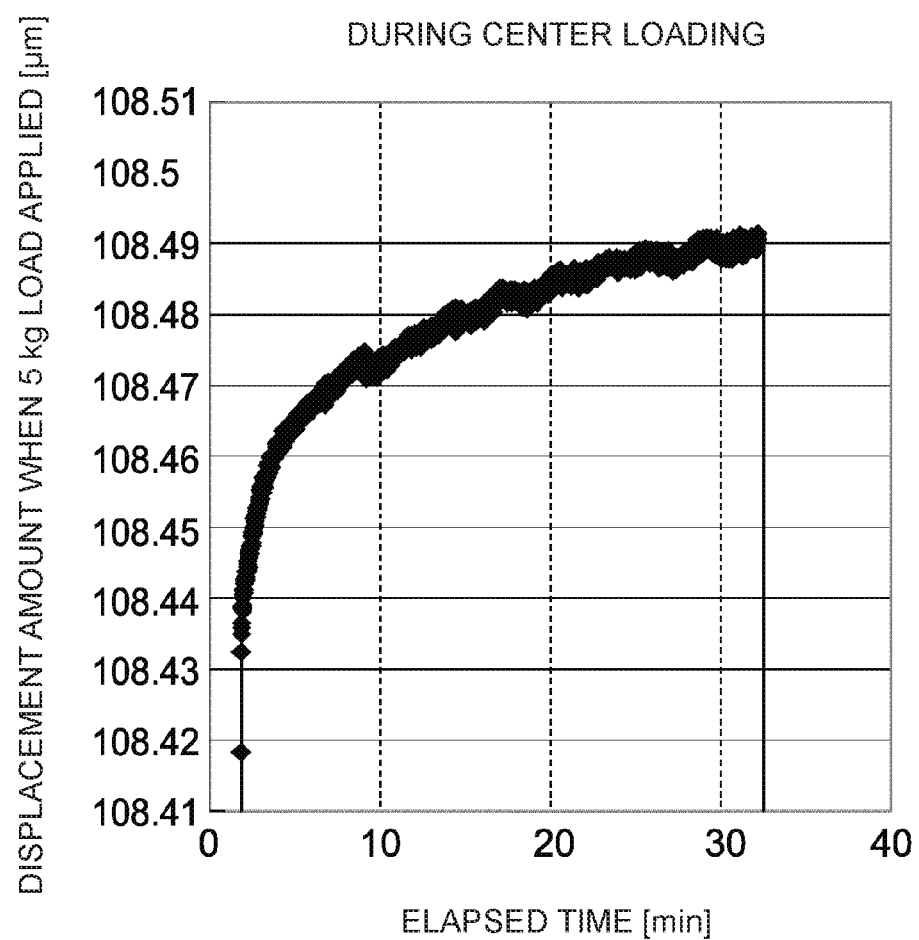
FIG. 11 illustrates the results of an experiment showing an example of the effects of the aforementioned load cell.

FIG. 11 illustrates an example in which a 5 kg measurement subject was placed and kept in the central area of the placement table 105 illustrated in FIG. 7A, and changes in the output (the displacement amount) of the optical displacement sensor 230 over time were measured for 30 minutes thereafter. The phenomenon in which the displacement amount changes as time passes as illustrated in FIG. 11 is called "creeping", and is produced by an asymmetrical structure of the load cell 200 caused by the offset of the optical axis of the optical displacement sensor 230 (a light flux (light ray) from the first optical block B1 to the second optical block B2; the same applied hereinafter). The phenomenon of the displacement amount rising as time passes, as in this example, is caused by downward displacement acting on the second diffraction grating 22, and will also be called "positive-direction creep" here.

Figure 12A:
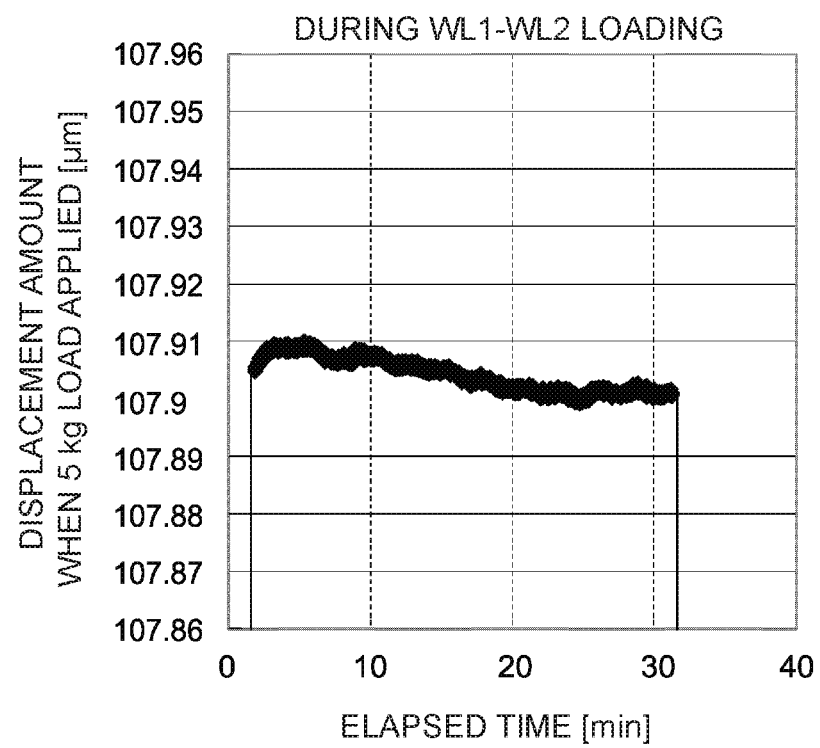
FIGS. 12A and 12B each illustrates the result of an experiment showing an example of the effects of the aforementioned load cell.
Figure 12B:
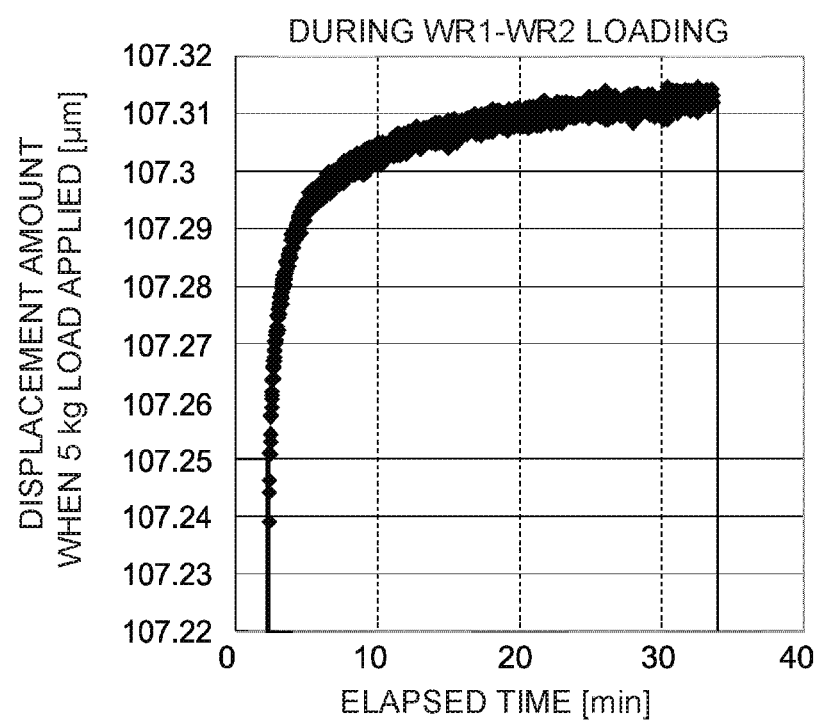

The change in displacement amount over time caused by creeping differs depending on the position where the load is applied, and to be more specific, the position of the measurement subject relative to the elastic body 101. FIG. 12A illustrates an example of creeping when the measurement subject is positioned toward the WL1-WL2 side, whereas FIG. 12B illustrates an example of creeping when the measurement subject is positioned toward the WR1-WR2 side.

The optical axis of the optical displacement sensor 230 is shifted toward the WR1-WR2 side, as illustrated in FIG. 7A. With this configuration, the displacement amount due to creeping decreases when the measurement subject is placed on the WL1-WL2 side, which is farther from the position where the displacement amount is measured (FIG. 12A), and conversely, the displacement amount due to creeping increases when the measurement subject is placed on the WR1-WR2 side, which is closer to the position where the displacement amount is measured (FIG. 12B). The reason for this is creeping caused by displacement acting on the second diffraction grating 22 due to the principle of leverage, as described in Embodiment 1 (see FIGS. 9B and 9C).

In more detail, when the measurement subject is placed on the WL1-WL2 side, upward moment acts on the second diffraction grating 22, and thus the variation in the displacement amount caused by creeping decreases, as illustrated in FIG. 12A (this will also be called "negative creep" hereinafter). On the other hand, when the measurement subject is placed on the WR1-WR2 side, downward moment acts on the second diffraction grating 22, and thus the variation in the displacement amount caused by creeping increases, as illustrated in FIG. 12B (this will also be called "positive creep" hereinafter).

In the examples illustrated in FIGS. 11 and 12, variation in the displacement amount over time caused by creeping can be reduced more when upward moment acts on the second diffraction grating 22. Thus placing the measurement subject in a region offset in the direction opposite from the direction in which the optical axis of the optical displacement sensor 230 is set with respect to the center axis AA' of the elastic body 101 makes it possible to suppress changes in the output of the load cell 200 over time caused by creeping, and accurately measure the weight of the measurement subject in a stable manner.

With the load cell 200 according to the present embodiment, when positions of measurement subjects relative to the elastic body 101 are about the same each time, fluctuations in the measurement value caused by creeping in the elastic body 101 can be suppressed, and the load can be measured accurately. This is advantageous when, for example, the load cell 200 is built into a conveyor belt and the weights of objects that are placed successively in a specific position on the conveyor belt are to be detected by the load cell 200.

In the present embodiment, optimizing the amount of offset of the optical axis of the optical displacement sensor 230 relative to the center axis AA' of the elastic body 101 makes it possible to adjust the output properties of the load cell 200 so as not to be susceptible to the effects of creeping. This amount of offset can be set as appropriate depending on the shape and size of the elastic body 101, the placement position of the measurement subject, and so on.

(Variations)

Figure 13A:
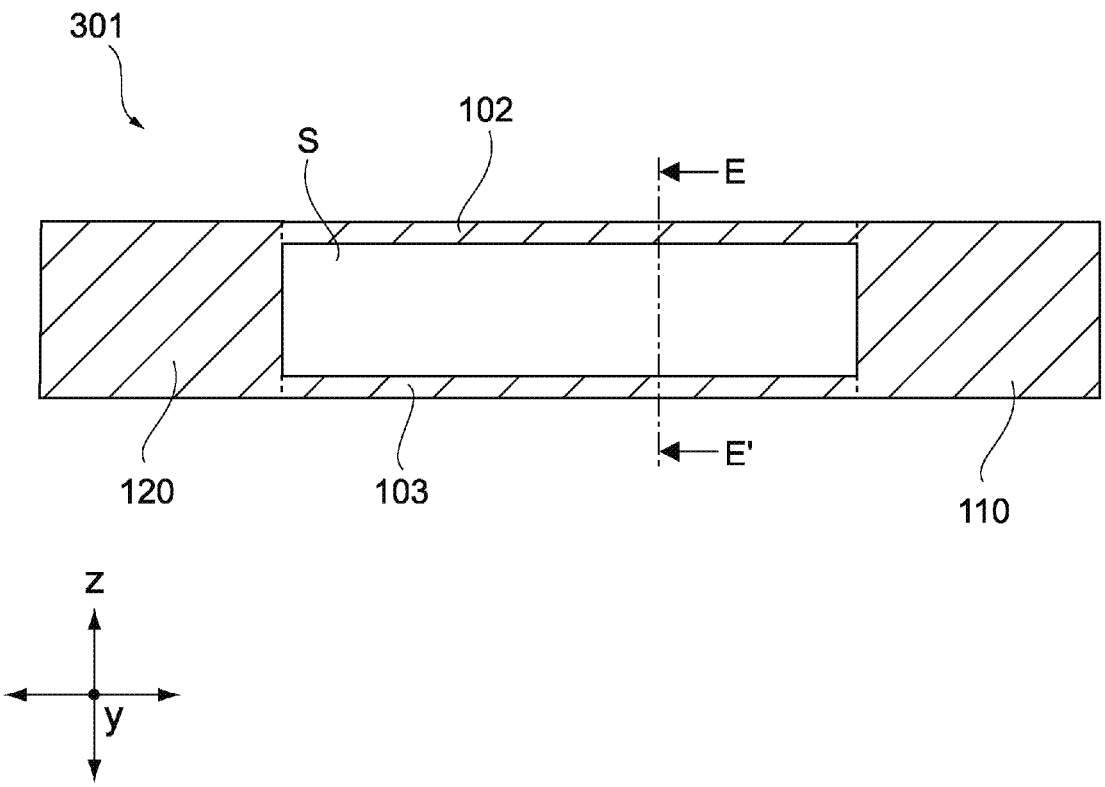
FIG. 13A is a schematic cross-sectional view of a variation on the configuration of an elastic body in the aforementioned load cell.
Figure 13B:
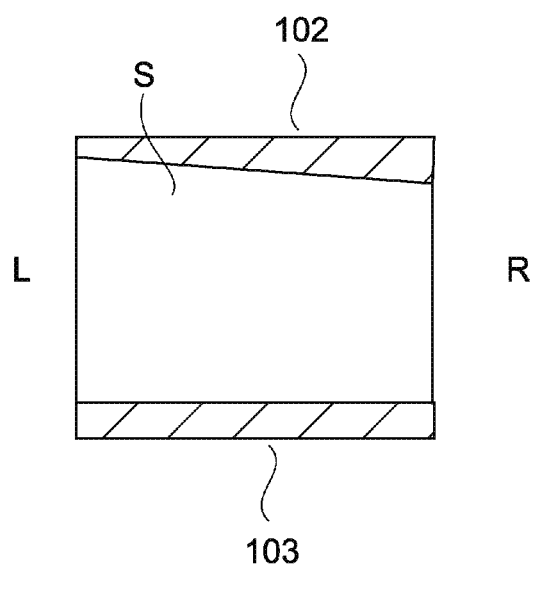
FIG. 13B is a cross-sectional view taken from a line EE' indicated in FIG. 13A.

In the present embodiment, the influence of creeping may be suppressed by varying the thickness of at least one of the bridge portions of the elastic body in the widthwise direction, as illustrated in FIGS. 13A and 13B. FIG. 13A is a side cross-sectional view of the elastic body, and FIG. 13B is a cross-sectional view taken along the line EE' in FIG. 13A. An elastic body 301 in these drawings is formed so that the thickness of the bridge portion 102 is different in each side surface of the elastic body 301, with the thickness on an L side (the WL1-WL2 side) being less than the thickness on the R side (the WR1-WR2 side).

In the elastic body 301 configured as described above, when the measurement subject is placed more toward the L side, the displacement amount of the elastic body 301 in the z-axis direction increases, and thus an upward displacement amount (negative creep) acting on the second diffraction grating 22 arranged offset toward the R side decreases. On the other hand, when the measurement subject is placed more toward the R side, the displacement amount of the elastic body 301 in the z-axis direction decreases, and thus a downward displacement amount (positive creep) acting on the second diffraction grating 22 arranged offset toward the R side decreases. According to this configuration, creep can be canceled out regardless of whether the load is acting on the L side or the R side, providing an advantage in that the effective area of the placement table 105 can be widened.

As illustrated in FIG. 13B, the bridge portion 102 is formed so that the thickness thereof changes continuously in the widthwise direction of the bridge portion 102. This makes it possible to prevent loads from concentrating in one region of the bridge portion 102. No special limitations are placed on the thickness of the bridge portion 102, which can be set as appropriate in accordance with the weight of the measurement subject, the position of the optical displacement sensor 230, and so on. Optimizing the L-side and R-side thicknesses of the bridge portion 102 makes it possible to measure loads in a stable manner, regardless of the position of the measurement subject on the placement table 105. The thickness of the bridge portion 103 may be varied between the L side and the R side, instead of or in addition to the bridge portion 102.

Furthermore, according to the elastic body 301 configured as described above, a high resistance to deformation can be ensured for the R side with respect to torsional stress about the x axis, both when the load acts on the L side and when the load acts on the R side. Accordingly, measurement error (bias placement error) caused by differences in the placement position of the measurement subject relative to the placement table 105 can also be reduced. Thus the same effects as in Embodiment 1 can be achieved by this example as well.

Furthermore, although the second diffraction grating 22 is constituted by a reflective diffraction grating in the above-described embodiments, the second diffraction grating 22 is not limited thereto, and may be constituted by a transmissive diffraction grating instead. In this case, the photodetector 40 may be arranged on a rear surface side of the second diffraction grating. Additionally, although the optical system path connecting the first diffraction grating 21 and the second diffraction grating 22 is linear, the optical system path may be bent as appropriate using mirrors, prisms, and so on.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A load cell, comprising:
   an elastic body having a first end portion, a second end portion opposite to said first end portion in one axial direction, and a bridge portion bridging the first and second end portions and defining a hollow space between said first and second end portions so that the first end portion and the second end portion are moveable relative to each other;
   a first optical unit having a light source and a first diffraction grating on which light from said light source is incident, said first optical unit being fixed to said first end portion and arranged in said hollow space;
   a second optical unit having a second diffraction grating on which diffracted light emitted from the first diffraction grating is incident to generate interference light, said second optical unit being fixed to said second end portion and arranged in said hollow space;
   a detector that detects said interference light; and
   a computation unit that computes a displacement amount of said second diffraction grating relative to said first diffraction grating on the basis of a signal obtained by said detector so as to detect a displacement amount of the second end potion relative to the first end portion.

2. The load cell according to claim 1,
   wherein said first diffraction grating and said second diffraction grating are arranged on a center axis passing through said hollow space and parallel to said one axial direction.

3. The load cell according to claim 2, further comprising:
   a placement table fixed to said second end portion for receiving an object having a weight to be measured,
   wherein said second diffraction grating is arranged in a position directly below a centroid of said placement table.

4. The load cell according to claim 1,
   wherein said first diffraction grating and said second diffraction grating are arranged respectively in positions offset in a widthwise direction of said elastic body from a center axis passing through said hollow space and parallel to said one axial direction.

5. The load cell according to claim 4,
   wherein said bridge portion comprises a pair of bridge members opposing each other with said hollow space defined therebetween, said bridge members respectively connecting said first end portion and said second end portion to each other; and
   at least one of said pair of bridge members has a thickness that varies in the widthwise direction of said elastic body orthogonal to said one axial direction.

* * * * *